(12) United States Patent
Lynch et al.

(10) Patent No.: US 11,075,396 B2
(45) Date of Patent: Jul. 27, 2021

(54) METHOD AND SYSTEM FOR IMPROVING THE ENERGY EFFICIENCY AND FOR RECONDITIONING OF A VANADIUM FLOW BATTERY

(71) Applicant: UNIVERSITY OF LIMERICK, Limerick (IE)

(72) Inventors: Robert Patrick Lynch, Limerick (IE); Nathan Quill, Limerick (IE); Andrea Bourke, Limerick (IE); Denis Noel Buckley, Limerick (IE)

(73) Assignee: UNIVERSITY OF LIMERICK

( * ) Notice: Subject to any disclaimer, the term of this patent is extended or adjusted under 35 U.S.C. 154(b) by 373 days.

(21) Appl. No.: 15/756,704

(22) PCT Filed: Sep. 2, 2016

(86) PCT No.: PCT/EP2016/070728
§ 371 (c)(1),
(2) Date: Mar. 1, 2018

(87) PCT Pub. No.: WO2017/037239
PCT Pub. Date: Mar. 9, 2017

(65) Prior Publication Data
US 2018/0331382 A1    Nov. 15, 2018

(30) Foreign Application Priority Data

Sep. 2, 2015  (EP) ..................................... 15183421

(51) Int. Cl.
| | | |
|---|---|---|
| *H01M 8/18* | (2006.01) |
| *H02J 7/00* | (2006.01) |
| *H01M 8/04858* | (2016.01) |
| *H01M 8/04186* | (2016.01) |
| *H01M 8/04223* | (2016.01) |
| *H01M 8/04746* | (2016.01) |
| *H01M 8/04664* | (2016.01) |

(52) U.S. Cl.
CPC ....... *H01M 8/188* (2013.01); *H01M 8/04186* (2013.01); *H01M 8/04238* (2013.01); *H01M 8/04664* (2013.01); *H01M 8/04753* (2013.01); *H01M 8/04895* (2013.01); *H01M 8/04925* (2013.01); *H01M 8/04949* (2016.02); *H02J 7/0068* (2013.01); *Y02E 60/50* (2013.01)

(58) Field of Classification Search
CPC .... H01M 8/18; H01M 8/188; H01M 8/04895; H01M 8/04925; H01M 8/04186; H01M 8/04238; H01M 8/04664; H01M 8/04753; H01M 8/04949
See application file for complete search history.

(56) References Cited

U.S. PATENT DOCUMENTS

| | | | |
|---|---|---|---|
| 2016/0013505 A1* | 1/2016 | Darling | H01M 8/20 429/418 |
| 2016/0049673 A1* | 2/2016 | Fukushima | G01R 31/382 429/429 |
| 2016/0285123 A1* | 9/2016 | Choi | H01M 8/20 |

FOREIGN PATENT DOCUMENTS

| | | |
|---|---|---|
| CN | 104143646 A | 11/2014 |
| EP | 2339682 A1 | 6/2011 |
| WO | 2014088601 A1 | 6/2014 |
| WO | 2014142968 A1 | 9/2014 |

OTHER PUBLICATIONS

PCT International Search Report for PCT International Patent Application No. PCT/EP2016/070728; dated Nov. 11, 2016; (4 pages).
PCT Written Opinion for PCT International Patent Application No. PCT/EP2016/070728; dated Nov. 11, 2016; (5 pages).

* cited by examiner

*Primary Examiner* — Bethany L Martin
(74) *Attorney, Agent, or Firm* — K&L Gates LLP

(57) ABSTRACT

The present invention comprises a method and system for improving the energy efficiency of a vanadium flow battery, VFB. This is achieved by simultaneously reconditioning the VFB through in-situ activation of the electrodes.

9 Claims, 14 Drawing Sheets

| Cycle | Positive η (mV) | | Negative η (mV) | |
|---|---|---|---|---|
| | Ch. | Disch. | Ch. | Disch. |
| 1 – 5 | 6.23 | 6.36 | 42.8 | 58.3 |
| 43 – 47 | 4.73 | 4.92 | 162 | 157 |

| Cycle | Positive η (mV) | | Negative η (mV) | |
| --- | --- | --- | --- | --- |
| | Ch. | Disch. | Ch. | Disch. |
| Before Switch (cycle 1 – 5) | 6.23 | 6.36 | 42.8 | 58.3 |
| Before Switch (cycle 43 – 47) | 4.73 | 4.92 | 162 | 157 |
| After Switch (cycle 1 – 5) | 3.16 | 9.22 | 25.6 | 29.6 |
| After Switch (cycle 36 – 40) | 5.036 | 6.14 | 43.8 | 55.5 | y
METHOD AND SYSTEM FOR IMPROVING THE ENERGY EFFICIENCY AND FOR RECONDITIONING OF A VANADIUM FLOW BATTERY

CROSS REFERENCE TO RELATED APPLICATIONS

This is the national phase under 35 U.S.C. § 371 of International Application No. PCT/EP2016/070728, filed on Sep. 2, 2016, which claims priority to and the benefit of European Patent Application No. 15183421.5, filed on Sep. 2, 2015, the entire disclosures of each of which are incorporated by reference herein.

FIELD

The present invention is concerned with the energy efficiency of vanadium flow batteries (VFBs). More particularly, the invention is concerned with how to increase the energy efficiency of VFBs by reducing the overpotential required for current to flow during the charging and the discharging of the battery.

BACKGROUND

There are conflicting reports in the literature as to whether either a $V^{II}/V^{III}$ or a $V^{IV}/V^{V}$ vanadium flow battery (VFB) half-cell has slower kinetics. Therefore it is assumed that the nature of the experiments reported in the literature may affect the kinetic rates of the $V^{II}/V^{III}$ and $V^{IV}/V^{V}$ redox reactions. Generally, the kinetics are found to be faster for $V^{IV}/V^{V}$ than for $V^{II}/V^{III}$. This has been found to be the case for cyclic voltammetry and steady state polarisation experiments on fixed glassy carbon electrodes, and for experiments with flowing electrolyte on carbon felt, carbon paper and graphite electrodes. However, reports based on steady state polarisation experiments at graphite rotating disks and cyclic voltammetry experiments at graphite-reinforced-carbon fixed electrodes have shown the opposite result, namely that $V^{IV}/V^{V}$ has slower kinetics than $V^{II}/V^{III}$. Thus, it will be appreciated that the electrode kinetics of these vanadium redox couples, which are the basis of the VFB, are not well understood.

During the operation of vanadium flow batteries (VFBs) the overpotential required for current to flow during charging and discharging decreases the energy efficiency of the battery. An increase in overpotential with continued cycling of the battery (and therefore a decrease in energy efficiency) has been observed.

To demonstrate the increase in overpotential (i.e. the decrease in voltage efficiency) during charging and discharging of vanadium flow batteries (VFBs), the charging and discharging behaviour of a laboratory scale VFB can be evaluated over multiple cycles. To aid understanding of this phenomenon, one such evaluation will now be described. In this evaluation, the starting catholyte was $V^{IV}$ sulphate in $H_2SO_4$ (total vanadium concentration of 2.0 mol dm$^{-3}$ and total sulphate concentration of 4.0 mol dm$^{-3}$) and the starting anolyte was $V^{III}$ sulphate in $H_2SO_4$ (total vanadium concentration of 2.0 mol dm$^{-3}$ and total sulphate concentration of 4.0 mol dm$^{-3}$). The temperature was 24° C., the flow rate was 0.4 ml s$^{-1}$, and each cycle was performed at 100 mA cm$^{-2}$ (2.5. A).

During cycling, a number of potentials were monitored with respect to time as the electrolyte was charged and discharged. The potentials monitored were cell potential, cell open-circuit potential, each half-cell working electrode potential, and each half-cell 'probe' potential (each of which serves as an approximation of the corresponding half-cell-electrode open-circuit potential). The cell potential was measured between the positive and negative working electrodes. Each half-cell working potential was measured between a reference electrode and the respective working electrode. Each half-cell probe potential was calculated between a reference electrode and the respective carbon probe electrode. The overpotential at each half-cell was then approximated by subtraction of the half-cell probe potential (which is an approximation of what the half-cell potential would be at open circuit) from the half-cell working potential. This allowed for comparison of and tracking of variations in the overpotentials of each half-cell during cell operation. As an approximation of the cells open-circuit potential, the 'control' potential was measured between a positive- and a negative-half-cell carbon probe electrode. This control potential was used to determine when the system had reached a desired state of charge (SoC) during charging and discharging. All the reference electrodes used in the experiment were silver/silver chloride reference electrodes.

FIG. 1 shows a set of data for the second charging and discharging cycle in this evaluation. It can be seen from the full cell potential, that the cell was initially held for 600 s at open-circuit (~1.34 V), after which the current was switched on at 100 mA cm$^{-2}$ (at 10739 s). The cell was charged, and its potential (~1.55 V at 10739 s) gradually increased to ~1.72 V at 14883 s. Subsequently, the current was switched off and the cell was held for 600 s at the open circuit potential (at ~1.51 V). At 15487 s, the cell was discharged at 100 mA cm$^{-2}$. The cell potential (~1.30 V at 15487 s) gradually decreased to ~1.09 V. Subsequently, the current was switched off, and after 600 s at the open circuit potential (~1.34 V) the current was switched on again (at 100 mA cm$^{-2}$), and the charging recommenced. The cell was charged and discharged in this manner for 47 cycles using the 'control' potential limits, that correspond to ~20% and 80% state of charge (SoC) during discharge and charge, respectively, to automatically switch off the current, hold at open circuit for 600 s, and then switch on the current in the opposite direction. These limits were determined, from the first charging and discharging cycle, as 0.964 V and 1.665 V.

The 'control' potential of the system during the second charging and discharging cycle is also shown in FIG. 1. It can be seen that during the times when the current was switched off, the curves representing the full cell potential and the cell open-circuit potential have the same values, as expected. However, when the current is on, these two curves have different values. The difference corresponds approximately to the overpotential required to charge or discharge the cell.

The positive half-cell and the negative half-cell potentials during charging and discharging are also shown in FIG. 1, allowing the origins for the changes in full cell potential to be deconvoluted. Since the cell potential depends on the positive and negative half-cell potentials, the curves associated with these potentials show similar behaviour to the full cell potential curve. It can be seen that, before charging, the positive half-cell and negative half-cell potentials have constant values of ~0.938 V (Ag/AgCl) and ~−0.402 V (Ag/AgCl), respectively.

When the current was switched on (at 10739 s), the positive half-cell potential increases rapidly to ~0.945 V, and the negative half-cell potential decreases rapidly to ~−0.440 V. As charging continues, the positive half-cell potential increases to ~1.037 V, and the negative half-cell potential decreases to ~−0.547 V. While the cell was held at open circuit, the positive and negative half-cell potentials have constant values of ~1.03 V and ~−0.481 V, respectively. At the start of discharging (at 15847 s), the positive half-cell potential decreases to ~1.024 V, and the negative half-cell potential increases to ~−0.444 V. During discharging, the positive half-cell potential decreases to ~0.932 V, and the negative half-cell potential increases to ~−0.338 V. While the cell was held at open circuit, the positive and negative half-cell potentials have constant values of ~0.937 V and ~−0.400 V, respectively.

The positive and negative probe potentials, during charging and discharging are also shown in FIG. 1, and indicated by the grey dashed curves. The positive half-cell probe potential gradually increases from 0.938 V (Ag/AgCl) to 1.031 V during charging, and decreases from 1.031 V to ~0.941 V during discharging, while the negative half-cell probe potential gradually decreases from ~−0.402 V (Ag/AgCl) to ~−0.478 V during charging, and increases from ~−0.480 V to ~−0.405 V during discharging.

The overpotential at each half-cell can be calculated by subtraction of a half-cell probe potential from the corresponding half-cell working potential. The positive and negative overpotentials during charging and discharging are shown in FIG. 2. It is clear that the negative overpotential is significantly larger than the positive overpotential. During charging, the positive overpotential varies between 5.7 mV and 9.8 mV (with an average value of 6.7 mV) while the negative varies between −21.5 mV and −69.3 mV (with an average value of −47.9 mV). Similarly, during discharging, the positive overpotential varies between −5.0 mV and −9.4 mV (with an average value of −6.8 mV) while the negative varies between 25.3 mV and 67.3 mV (with an average value of 52.2 mV). Thus, the negative overpotential is almost an order of magnitude larger than that of the positive. This difference between the negative and positive overpotentials is in agreement with the slower kinetics usually observed for $V^{II}/V^{III}$ with respect to $V^{IV}/V^{V}$ oxidation-reduction.

As previously mentioned, the data shown in FIG. 1 is from the second cycle in a series of multiple-cycle experiments. So as to show the increase in overpotential (i.e. decrease in voltage efficiency) during operation, the cell was run for 47 charging-discharging cycles. FIG. 3 shows the positive and negative overpotentials during the (a) first 5 and (b) final 5 cycles of the 47 cycles. It will be appreciated from a review of this figure that for all cycles the negative overpotential is significantly larger than the positive. Furthermore, the negative overpotential increases with cycle number. In fact, by cycle 43, the negative overpotential has approximately tripled (see FIG. 3 (b)). The positive overpotential, however, shows very little change with cycle number. FIG. 4 shows the positive overpotentials in FIG. 3 when replotted on a more sensitive y-axis scale, from which it can be seen that the positive overpotentials have decreased by ~1 mV over the 47 cycles.

There are a number of reasons for variations in the overpotential from cycle to cycle. These include changes in the operating SoC of the electrolyte, such as for example due to vanadium transfer, concentration of vanadium, temperature, pH, or activity of the electrodes (i.e. the change in the respective vanadium kinetics at each electrode).

It is thus an object of the present invention to provide a system and method for improving the energy efficiency of a VFB by reducing this overpotential which occurs during the charging and discharging process.

International Patent Publication No. WO2014/142968 discloses a flow battery which includes a cell that has a first and a second electrode and an electrolyte separator layer arranged between the electrodes. A supply/storage system is external of the cell and includes a first vessel connected in a first loop with the first electrode and a second vessel connected in a second loop with the second electrode. The first loop and the second loop are isolated from each other. The supply/storage system is configured to fluidly connect the first loop and the second loop to move a second liquid electrolyte from the second vessel into a first liquid electrolyte in the first vessel responsive to a half-cell potential at the first electrode being less than a defined threshold half-cell potential. However this method focuses on the isolated treatment of either the positive or negative electrodes through oxidation of the electrode and it does not facilitate multiple reactivations and deactivations of electrodes.

SUMMARY

According to the invention there is provided, as set out in the appended claims, a method for improving the energy efficiency of a vanadium flow battery, VFB, comprising simultaneously reconditioning the negative electrode and the positive electrode of the VFB.

In one embodiment the step of reconditioning the VFB comprises electrochemically reactivating the positive electrode and the negative electrode of the VFB.

In one embodiment the step of electrochemically reactivating the positive electrode and the negative electrode comprises applying an activation potential to the negative electrode for $V^{II}/V^{III}$ oxidation-reduction and applying an activation potential to the positive electrode for $V^{IV}/V^{V}$ oxidation-reduction.

In one embodiment the activation potential of the positive electrode corresponds to the negative half-cell working potential following operating the VFB for a number of charge and discharge cycles and the activation potential of the negative electrode corresponds to the positive half-cell working potential following operating the VFB for a number of charge and discharge cycles.

In one embodiment the activation potential of the positive electrode corresponds to the negative half-cell working potential and the activation potential of the negative electrode corresponds to the positive half-cell working potential.

In one embodiment the step of applying the activation potential to the positive electrode and to the negative electrode comprises the steps of switching the positive half-cell and the negative half-cell electrodes of the VFB following operating the VFB for a number of charge and discharge cycles.

In one embodiment the step of switching the positive half-cell and the negative half-cell electrodes comprises:
draining the positive half-cell into the positive reservoir of the VFB and draining the negative half-cell into the negative reservoir of the VFB; and
connecting the negative reservoir to the positive half-cell and connecting the positive reservoir to the negative half-cell.

In one embodiment there is provided the further step of disconnecting the positive reservoir from the positive half-cell and the negative reservoir from the negative half-cell after draining the positive half-cell and the negative half-cell.

In one embodiment the step of applying the activation potential to the positive electrode and to the negative electrode comprises the step of:

overdischarging the electrolyte at the negative electrode from $V^{II}/V^{III}$ to at least $V^{IV}$ and overdischarging the electrolyte at the positive electrode from $V^{IV}/V^{V}$ to at least $V^{III}$.

In one embodiment the step of applying the activation potential to the positive electrode and to the negative electrode comprises the step of:
overdischarging the electrolyte at the negative electrode from $V^{II}/V^{III}$ to at least $V^{IV}$ and overdischarging the electrolyte at the positive electrode from $V^{IV}/V^{V}$ to at least $V^{III}$ while controlling the current through the cell or the potential at an electrode.

In one embodiment there is provided the step of overdischarging the electrolytes at the negative electrode and the positive electrode by preventing the pumping of the electrolytes of the VFB during a discharge cycle.

In one embodiment there is provided the step of re-establishing the state of charge, SoC, of the electrolyte in the positive half-cell and the electrolyte in the negative half-cell to the operating SoCs prior to restarting the operation of the VFB.

In one embodiment the step of re-establishing the state of charge, SoC, of the electrolyte in the positive half-cell and in the negative half-cell to the operating SoCs comprises the step of pumping the electrolytes of the VFB prior to commencing a charging cycle of the VFB.

In one embodiment the step of operating the VFB for a number of charge and discharge cycles comprises operating the VFB for an initial charging cycle.

In one embodiment the step of operating the VFB for a number of charge and discharge cycles comprises operating the VFB for an initial controlled charging cycle.

In one embodiment the step of switching the positive half-cell and the negative half-cell comprises:
overdischarging the electrolyte at the negative electrode from $V^{II}/V^{III}$ to $V^{III}$ to $V^{IV}$ to $V^{IV}/V^{V}$ and overdischarging the electrolyte at the positive electrode from $V^{IV}/V^{V}$ to $V^{IV}$ to $V^{II}$ to $V^{II}/V^{III}$.

In one embodiment the step of applying the activation potential to the positive electrode and to the negative electrode comprises the step of:
overdischarging the electrolyte at the negative electrode from $V^{II}/V^{III}$ to $V^{III}$ to $V^{IV}$ to $V^{IV}/V^{V}$ and overdischarging the electrolyte at the positive electrode from $V^{IV}/V^{V}$ to $V^{IV}$ to $V^{II}$ to $V^{II}/V^{III}$.

In one embodiment there is provided the step of overdischarging the electrolytes at the negative electrode and the positive electrode during the pumping of the electrolytes of the VFB.

In another embodiment there is provided a method for improving the energy efficiency of a vanadium flow battery, VFB, comprising:
reconditioning the VFB after operating the VFB for a number of charge and discharge cycles.

In another embodiment there is provided a system for improving the energy efficiency of a vanadium flow battery, VFB comprising:
means for simultaneously reconditioning the negative and positive electrodes of the VFB.

In one embodiment the means for reconditioning the VFB comprises means for electrochemically reactivating the positive electrode and/or the negative electrode of the VFB.

In another embodiment there is provided a system for improving the energy efficiency of a vanadium flow battery, VFB comprising:
means for reconditioning the VFB after operating the VFB for a number of charge and discharge cycles.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The present invention provides a method and system for increasing the energy efficiency of a vanadium flow battery by reducing the overpotential which occurs during the charging and discharging process. This is achieved by reconditioning the VFB electrodes. This reconditioning of the VFB electrodes can be performed simultaneously. The reconditioning can be performed before normal operation of the VFB has commenced. The reconditioning can also be performed after operating the VFB for a number of charge and discharge cycles. Each reconditioning can be performed for any duration. Furthermore, the reconditioning can be repeated on many occasions, such as for example whenever the voltage efficiency of the VFB has reduced.

Figure 1:
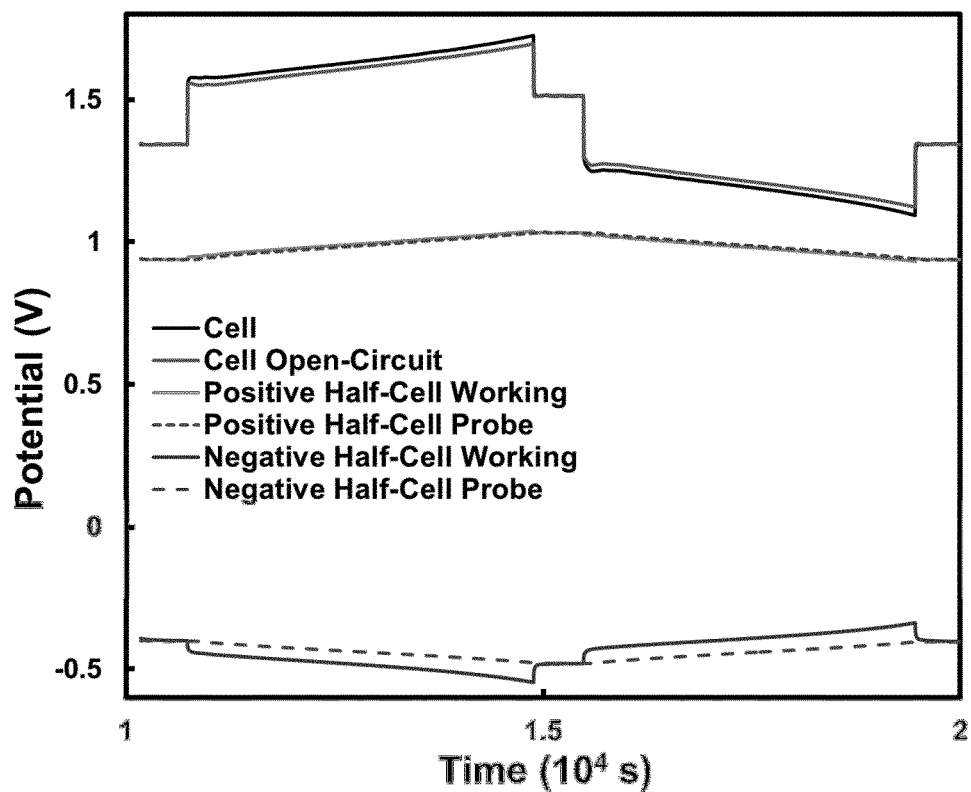
FIG. 1 shows the cell potential, cell open-circuit potential, each half-cell working potential and the positive and negative probe potentials for the second charging and discharging cycle of a vanadium flow battery (VFB)
Figure 2:
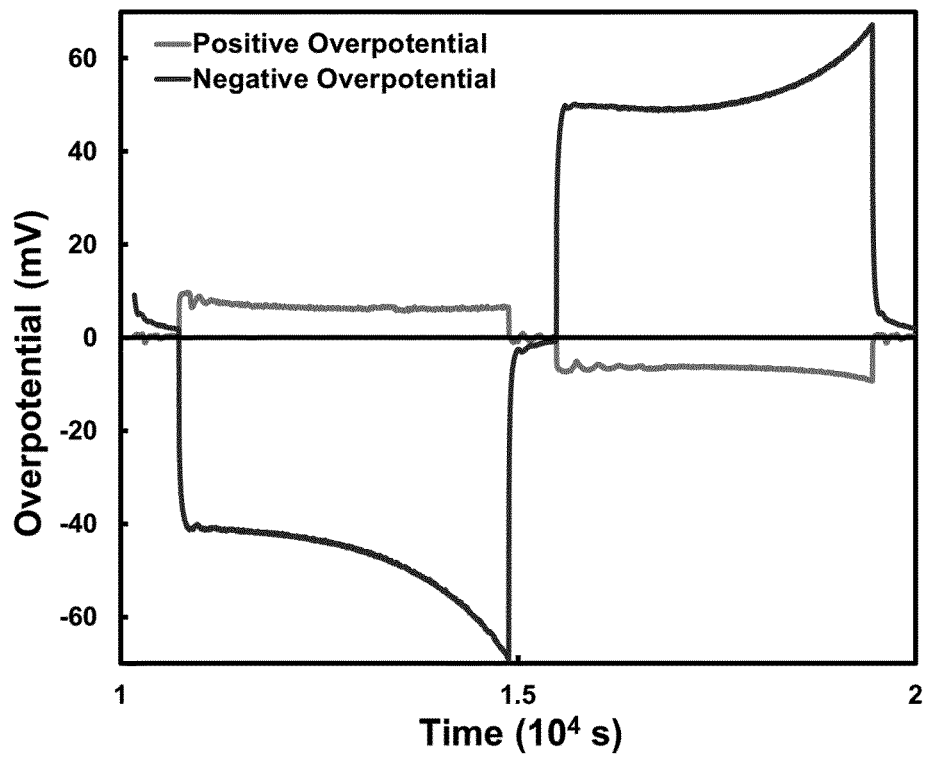
FIG. 2 shows a plot of the positive and negative overpotential for the charging and discharging data shown in FIG. 1.
Figure 3A:
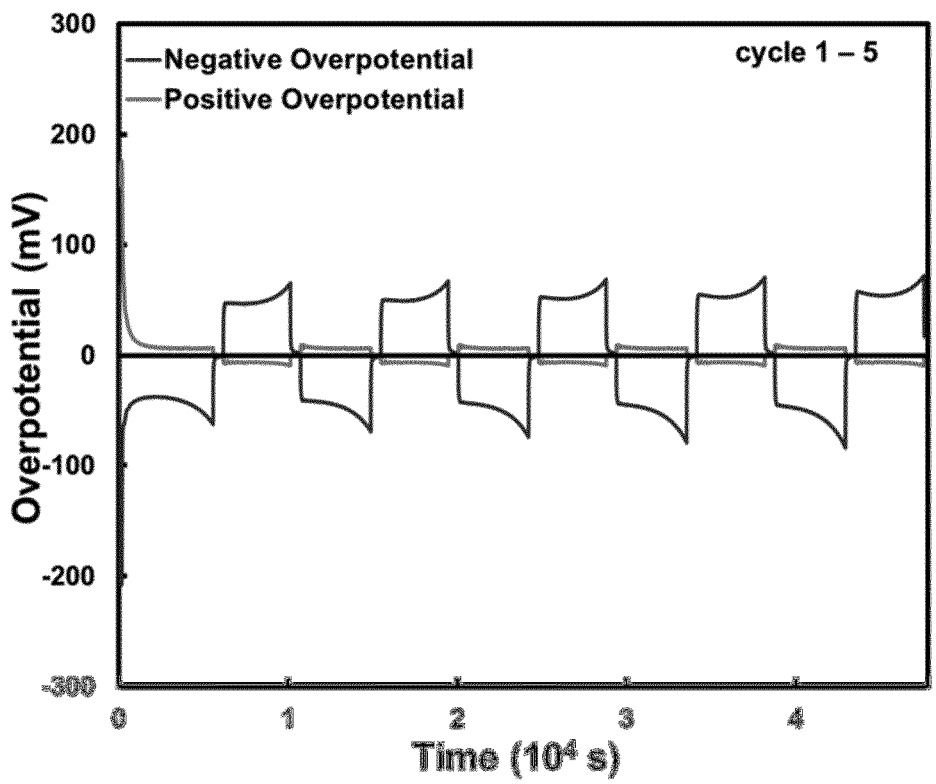
FIG. 3 shows a plot of the positive and negative overpotentials during (a) the first 5 cycles and (b) the final 5 cycles of 47 cycles for the VFB of FIG. 1.
Figure 3B:
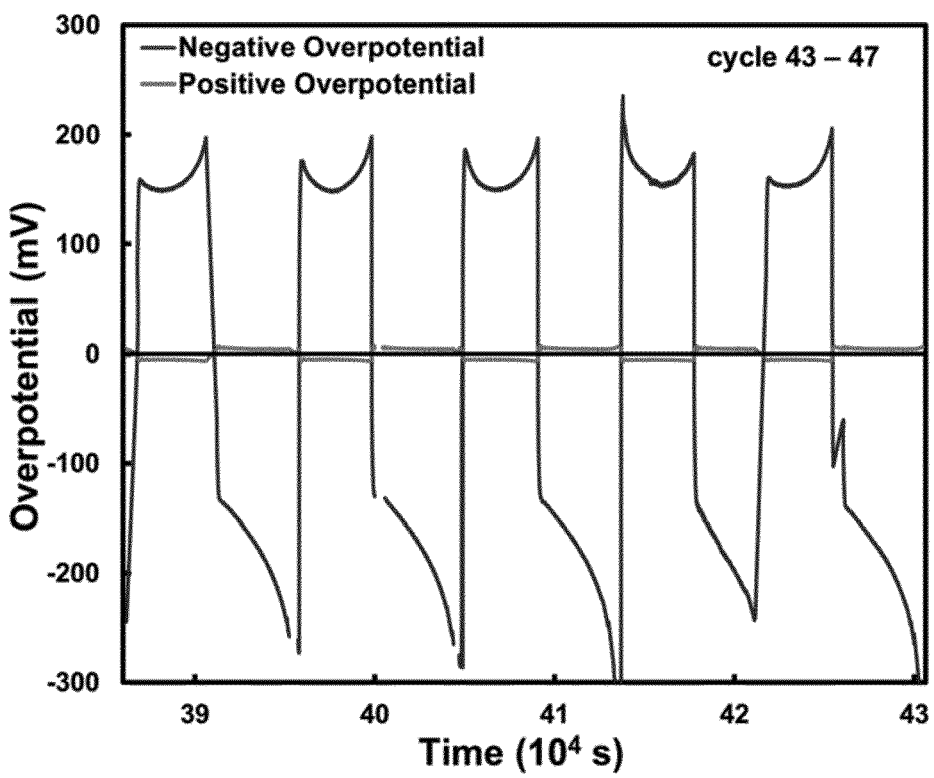
Figure 4A:
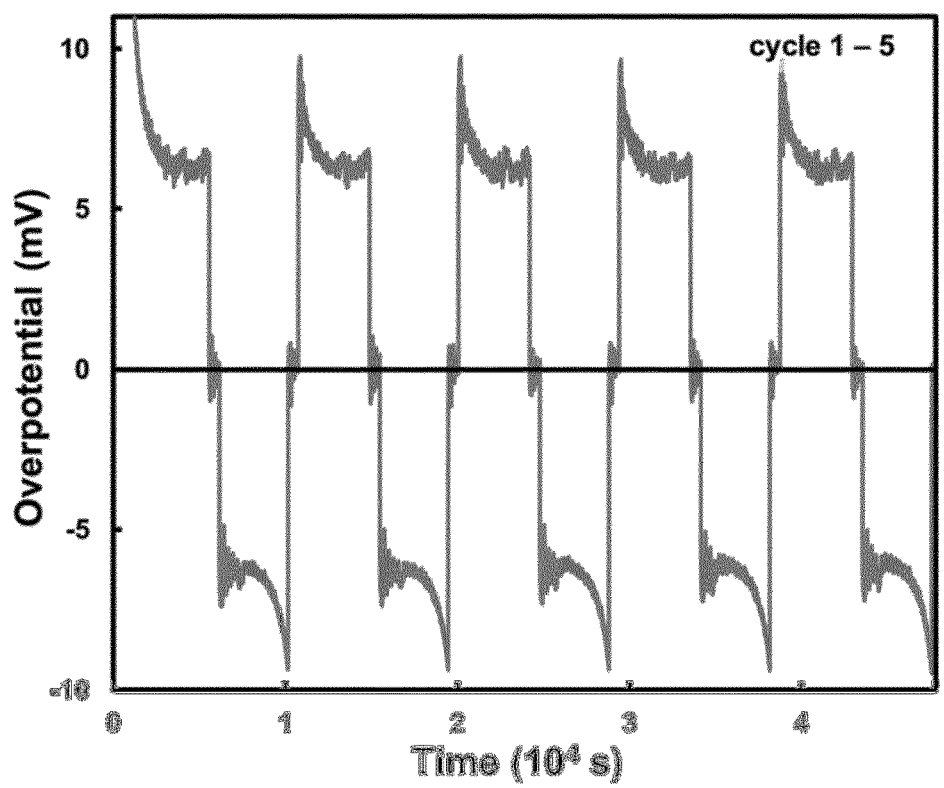
FIG. 4 shows a plot of the positive overpotentials during (a) the first 5 cycles and (b) the final 5 cycles for the VFB of FIG. 1.
Figure 4B:
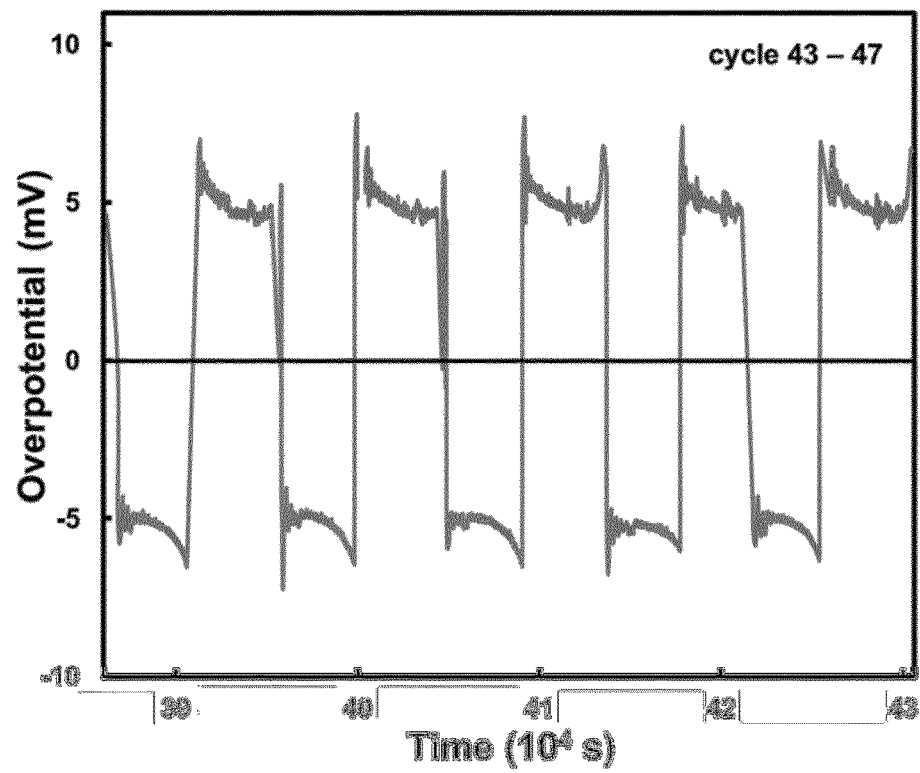
Figure 5A:
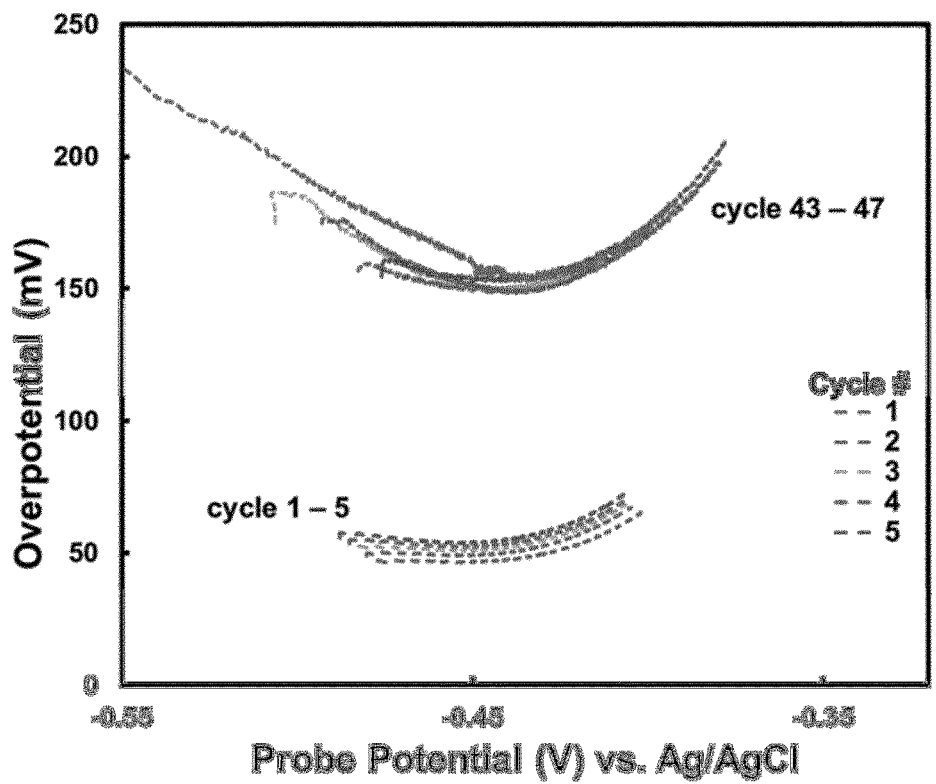
FIG. 5 shows a plot of the negative overpotentials versus probe potential during (a) discharging and (b) charging for the first 5 cycles and final 5 cycles of 47 cycles for the VFB of FIG. 1.
FIG. 5c shows a table of the approximate positive overpotentials at probe potentials of 1.01 V and approximate negative overpotentials at probe potentials of −0.42 V during charging and discharging for the first 5 and the final 5 cycles of 47 cycles for the VFB of FIG. 1.

An understanding of how the overpotential can be reduced by reconditioning the VFB after operation for a number of charge and discharge cycles can be obtained from an analysis of further figures. In this regard, FIG. 5 shows plots of negative overpotentials versus probe potential during (a) discharging and (b) charging for the first 5 cycles (dashed lines) and final 5 cycles (dotted lines) cycles (of 47 cycles) of the evaluation described in the background to the invention with respect to FIGS. 1 to 4. The negative probe potential is a function of $[V^{II}]/[V^{III}]$, and hence a function of the SoC. As previously explained, the overpotentials during discharging (FIG. 5(a)) increase with cycling, and by cycle 43, the negative overpotential has approximately tripled. It can also be seen that the probe potential region of operation has changed with cycle number, but there are regions of probe potential that are common to both sets of curves (i.e. regions of the same SoC) and at these common potentials, the overpotentials for the later cycles are much larger than those for the earlier cycles. Thus, the change in overpotential is not due to a change in the SoC. Furthermore, the change in overpotential is not due to changes in temperature, since the temperature was relatively constant for the duration of these 47 cycles (the temperature for the first 5 cycles was 23.7±0.7° C., and the temperature for the last 5 cycles was 23.0±0.6° C.). It will further be appreciated that the change in overpotential is also not due to changes in concentration of either vanadium or acid, since these would not account for such large changes in overpotential (i.e. a factor of three). It follows that the increase in overpotential is due to deactivation of the negative electrode.

Figure 5B:
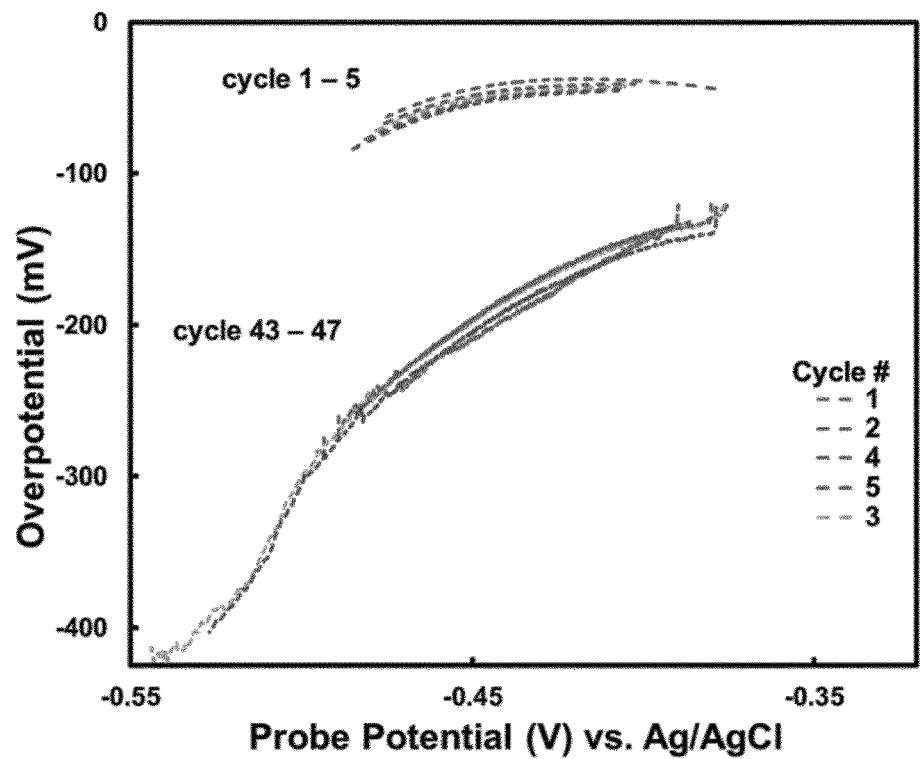

FIG. 5(b) shows a plot of negative overpotentials versus probe potential during charging. The overpotential can be seen to have tripled at selected probe potentials (i.e. SoC). The substantial increase in negative overpotential is shown more clearly in FIG. 5c, where the negative overpotentials at negative probe potentials of −0.42 V during charging and discharging for the first 5 and the final 5 cycles (of 47 cycles) are summarised. Also shown are the positive overpotentials at positive probe potentials of 1.01 V during charging and discharging for these cycles. This shows that there is very little change (~1 mV) in the positive overpotential.

Figures 5C, 6:
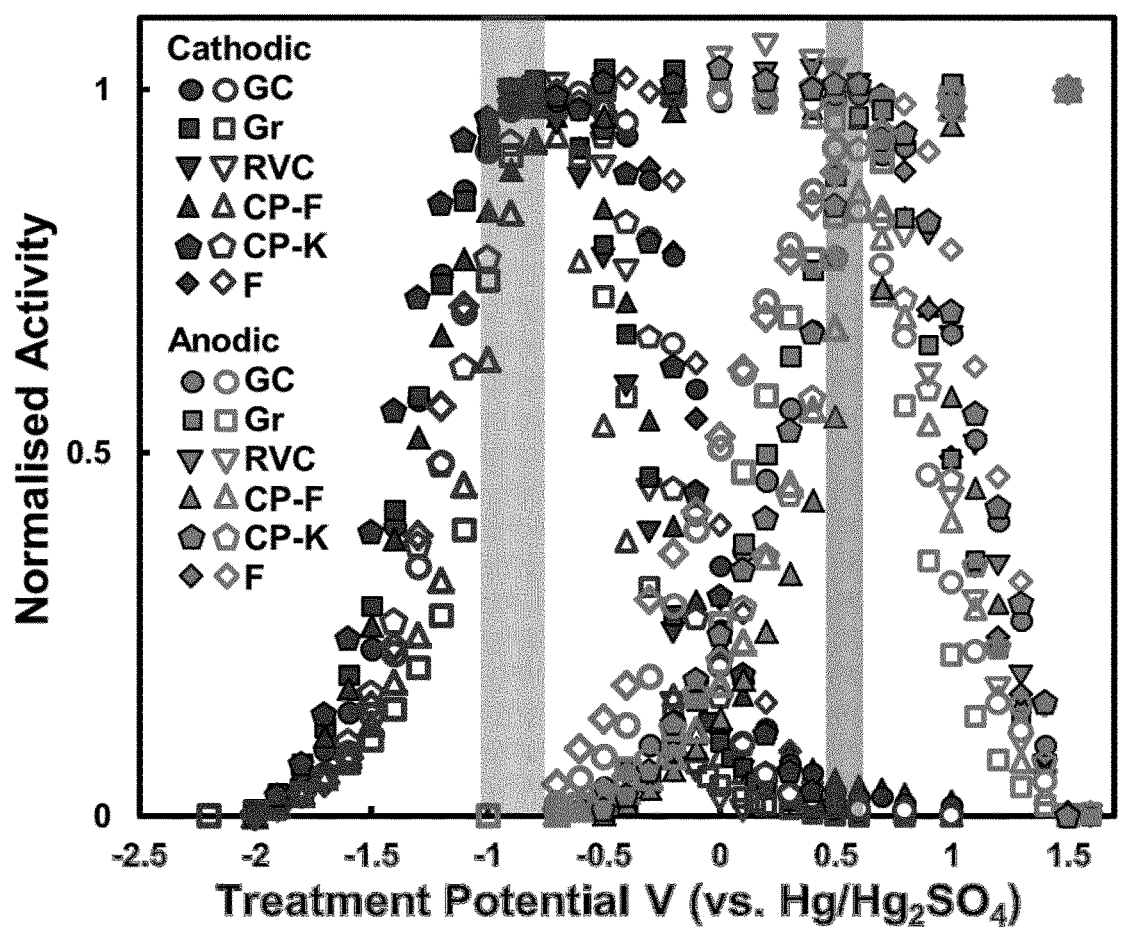
FIG. 6 shows the normalised activities obtained from both cyclic voltammetry and electrochemical impedance spectroscopy for each of 6 carbon materials for both $V^{II}/V^{III}$ and $V^{IV}/V^{V}$. Also shown are the bands of operating potentials experienced by both the positive and negative half-cells during charging and discharging for the VFB of FIG. 1.

In this regard, FIG. 6 shows the bands of operating potentials for both the positive (right hand vertical line) and negative (left hand vertical line) half-cells from the results discussed with reference to FIG. 1 to FIG. 5. Also shown in FIG. 6 are the normalised activities obtained from both cyclic voltammetry and electrochemical impedance spectroscopy for each of 6 carbon materials for both $V^{II}/V^{III}$ and $V^{IV}/V^V$. It is clear from this figure that the negative half-cell operating potential is negative enough to cause deactivation of the electrode for $V^{II}/V^{III}$. Thus, it is unsurprising that the overpotential of the negative half-cell during cycling became progressively worse over the 47 cycles. It is also clear that the positive half-cell operating potential is not positive enough to cause significant deactivation of the electrode for $V^{IV}/V^V$. Thus, it is unsurprising that the overpotential of the positive half-cell remained at a very low value for the duration of the 47 cycles.

It is also clear in FIG. 6 that the positive half-cell working potential is positive enough to cause activation of the electrode for $V^{II}/V^{III}$ oxidation-reduction. Similarly, the negative half-cell working potential is negative enough to cause activation of the electrode for $V^{IV}/V^V$ oxidation-reduction.

Thus, it will be appreciated that during operation of a flow battery, the overpotential increases at the negative electrode and sometimes at the positive electrode. This results in a decrease in the energy efficiency of the battery. The present invention reduces this overpotential by applying activation potentials to the negative and positive electrode, in order to minimise the overpotentials of both electrodes. Accordingly, by changing the activity (i.e. the kinetics of the $V^{IV}/V^V$ or $V^{II}/V^{III}$ redox couples) at the electrodes by anodisation or cathodisation of the electrode, the energy efficiency of the system can be increased.

It should be noted that these treatments are reversible, and the states of activity can be toggled by switching from one treatment to another. Anodic treatment of carbon electrodes leads to enhancement of the rates of the $V^{II}/V^{III}$ reactions, but inhibition of the rates of the $V^{IV}/V^V$ reactions. Conversely, cathodic treatment leads to inhibition of the $V^{II}/V^{III}$ reactions but enhancement of the $V^{IV}/V^V$ reactions. In this regard, there are three distinct regions of potential, corresponding to three different surface states consisting of an oxidised, an intermediate and a reduced state. The intermediate state is responsible for activation of the electrodes, and the oxidised and reduced states are responsible for deactivation of the electrodes.

The present invention describes a number of different embodiments for the in-situ activation treatment of the electrodes in a VFB. However, it will be appreciated that any other suitable method for treatment of the electrodes could equally well be used in order to reduce the overpotential during battery operation.

In accordance with a first embodiment of the method of the invention, the overpotential is reduced through a technique which involves switching the positive and negative half-cells. This switching results in an increase in electrode kinetics and, therefore, an increase in energy efficiency. It will be appreciated that the number of cycles is arbitrary. The ideal number can be system dependent since it can be dependent on the ratio of electrolyte in the cells and electrolyte in the reservoirs. Furthermore the number can be dependent on how the battery was cycled, for example whether the SoC is between 20 and 80% or some other range and whether the current density was 100 mA m$^{-2}$ or some other value.

Figure 7:
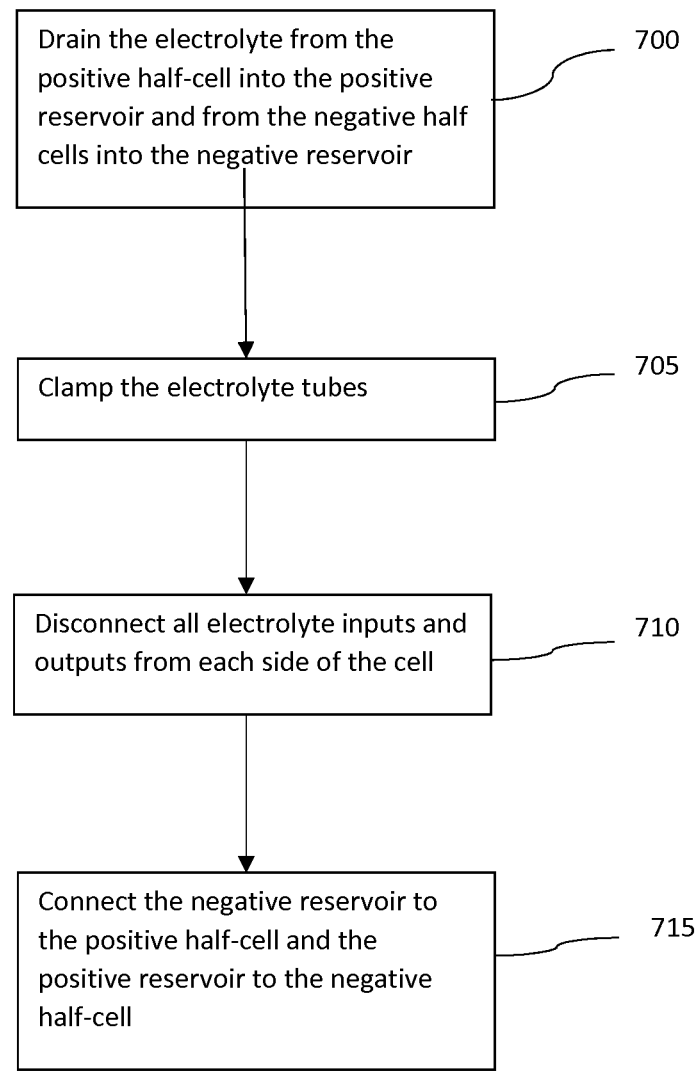
FIG. 7 shows the process flow of the first embodiment of the method of the present invention.

The switching of the positive and negative half-cells involves a number of steps, which are shown in FIG. 7. In step 700, the electrolyte in the negative and positive half-cells are drained into their respective reservoirs. The electrolyte tubes are then clamped (step 705). All electrolyte inputs and outputs from each side of the cell can then be disconnected (step 710). In step 715, the negative reservoir is then connected to the positive half-cell and the positive reservoir connected to the negative half-cell and the electrolyte allowed to flow again. In this manner, the electrode that formerly contained $V^{II}/V^{III}$ and was the negative electrode now contains $V^{IV}/V^V$ and is now the positive electrode while the electrode that formerly contained $V^{IV}/V^V$ and was the positive electrode now contains $V^{II}/V^{III}$ and is now the negative electrode. As a result, the new positive electrode had been treated at reducing potentials while the new negative electrode had been treated at oxidising potentials. This results in minimising the overpotentials on both electrodes and re-establishing energy efficiency through the reconditioning of the electrodes.

Figure 8:
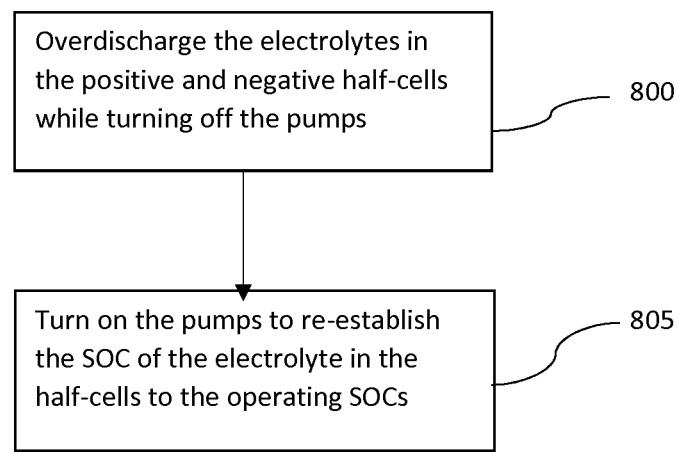
FIG. 8 shows the process flow of the second embodiment of the method of the present invention.

A second embodiment of the method of the present invention will now be described with reference to FIG. 8. In accordance with this embodiment, the electrolyte flow is turned off during discharging of the system when the current is still on by turning off the pumps (step 800). This results in the electrolyte in the positive and negative half-cells being overdischarged while the electrolyte outside of the cell, such as in the reservoirs, stays at the original operating state of charge (SoC). Therefore, as the electrolyte is overdischarged—from $V^{II}/V^{III}$ to $V^{IV}$ (or further) at the negative electrode and from $V^{IV}/V^V$ to $V^{III}$ (or further) at the positive electrode—the electrode and electrolyte potentials will correspond to activation potentials for the respective electrodes causing both the negative and positive electrodes to be reactivated (see FIG. 6).

The method of the second embodiment thus simultaneously reconditions the positive and negative electrodes using suitable potentials while the electrolyte pumps are turned off. As this method is fast, efficient and well understood, it allows VFB electrodes to be routinely reconditioned in-situ.

It is important that the electrolyte flow is turned off in this second embodiment of the method of the present invention. In this manner, the treatment is performed quickly (since only a fraction of the electrolyte is used), with a region of treatment potentials that causes activation can be easily accessed. In addition, the electrolyte that is left in the reservoirs and tubes can be used to facilitate the re-establishment of SoC to normal operating levels without electrochemical charging of the electrolyte. Furthermore, during periods of non-use, there would be advantages associated with leaving the electrolyte in these discharged states within each half-cell, since not only will the activity of the electrodes be maintained, but these discharged electrolytes ($V^{III}$ and $V^{IV}$) are more stable than the charged electrolytes ($V^{II}$ and $V^V$) over a wide range of temperatures.

Once cycling is to be restarted, the pumps should be turned on again before the application of any significant current, so that the electrolyte in the reservoirs will re-establish the SoC of the electrolyte in the half-cells back to operating SoCs (step 805). It is important to re-establish SoC of the electrolyte in this manner, or by using a very small charging current, since the large overpotentials that are required for conversion of $V^{III}$ to $V^{IV}$ and vice-versa can diminish or cancel the beneficial effects of the in-situ electrochemical treatment.

The second embodiment of the invention can also be implemented after the initial charge from the starting 50:50 $V^{III}/V^{IV}$ electrolyte (which is often used when commissioning batteries and after 'mixing' of electrolytes for re-establishing of battery capacity). Charging at these SoCs requires relatively high overpotentials for conversion of $V^{III}$ to $V^{IV}$ and vice-versa. These overpotentials and resulting high cathodic and anodic potentials at the negative and positive electrodes, respectively can cause the activity of the electrodes to decrease. Therefore, since the kinetics of the $V^{III}/V^{IV}$ redox couple are very slow, very small currents should be used during initial charging until all $V^{III}$ is converted to $V^{IV}$ at the positive electrode and all $V^{IV}$ is converted to $V^{III}$ at the negative electrode. For the same reason, the new $V^{III}/V^{IV}$ electrolyte should be added at a slow pump rate, so that most of the charging occurs under normal operating conditions, that is under conditions of fast kinetics such as those of the $V^{II}/V^{III}$ and $V^{IV}/V^V$ couples. In this manner, the $V^{III}/V^{IV}$ is converted primarily by chemical reactions in solution to the redox couples of operating electrolytes.

A third embodiment of the method of the present invention will now be described. In accordance with this embodiment, the polarity of the system is changed by overdischarging a battery while pumping of the electrolyte continues. This is in contrast to the second embodiment of the invention, where the pumping of the electrolyte was turned off. As a result, the negative electrolyte changes from $V^{II}/V^{III}$ to $V^{IV}/V^V$ while the positive electrolyte changes from $V^{IV}/V^V$ to $V^{II}/V^{III}$. Thus, the negative electrode becomes the positive electrode, and the positive electrode becomes the negative electrode. It will be appreciated that in accordance with this third embodiment of the invention, the polarity of the battery is switched without the need for the redirection of the electrolyte. This is in contrast to the method of the first embodiment, where the electrolyte is redirected. It should be noted however, that if the current used during this process is too great, the benefits of the new positive electrode having a history of being held at reducing potentials and the benefits of the new negative electrode having a history of being held at oxidising potentials will be diminished or cancelled. However, if the benefits are diminished or cancelled they can be re-established by carrying out the method of the second embodiment of the invention. As explained in respect of this second embodiment, low currents with no pumping when $V^{III}/V^{IV}$ is present in the cell, as well as the gradual addition of $V^{III}/V^{IV}$ electrolyte to the cell through slow pumping can be used so as to avoid large overpotentials.

The reduction in the overpotential of both electrodes which results from the implementation of the first embodiment of the invention will now be described with the aid of further figures. As an example, the method of the first embodiment of the invention can be carried out directly after a cell has undergone 47 charge and discharge cycles. A series of charging and discharging cycles can then be performed between the 'control' potential previously mentioned and the overpotentials approximated as described for FIG. 2 after the positive and negative half cells have been switched.

Figure 9A:
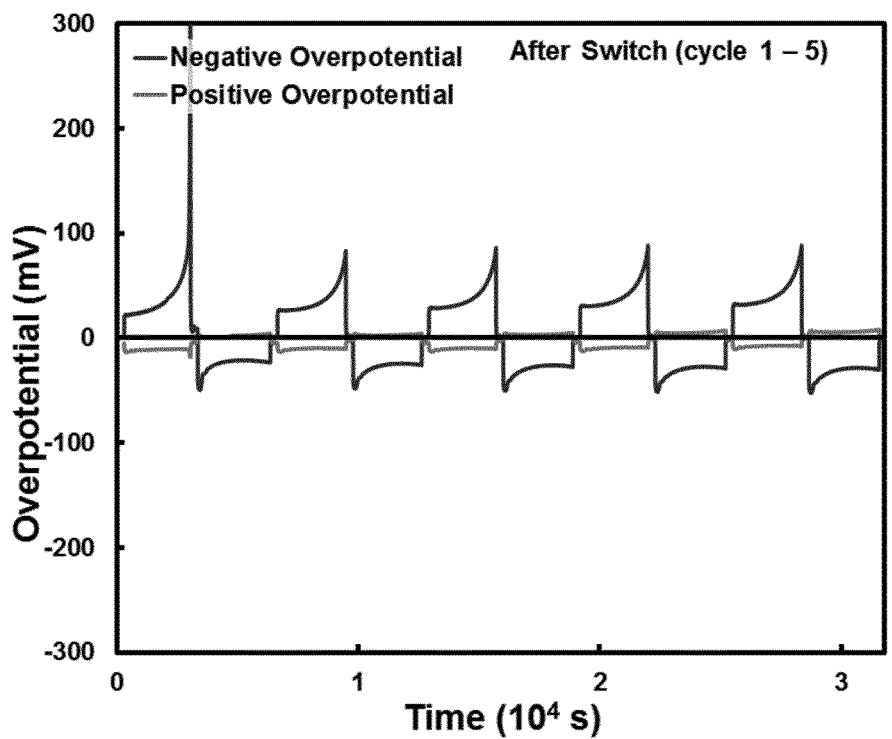
FIG. 9 shows a plot of the positive and the negative overpotentials during (a) the first 5 cycles and (b) final 5 cycles of 40 cycles after switching the electrodes of the VFB of FIG. 1 in accordance with the first embodiment of the method of the present invention.
FIG. 9c shows a table of the approximate positive overpotentials at probe potentials of 1.01 V and approximate negative overpotentials at probe potentials of −0.42 V during charging and discharging for the first 5 cycles and the final 5 cycles of 47 cycles of the VFB of FIG. 1 before switching the electrodes and the first 5 cycles and final 5 cycles of 40 cycles after switching the electrodes in accordance with the first embodiment of the method of the present invention.
Figure 9B:
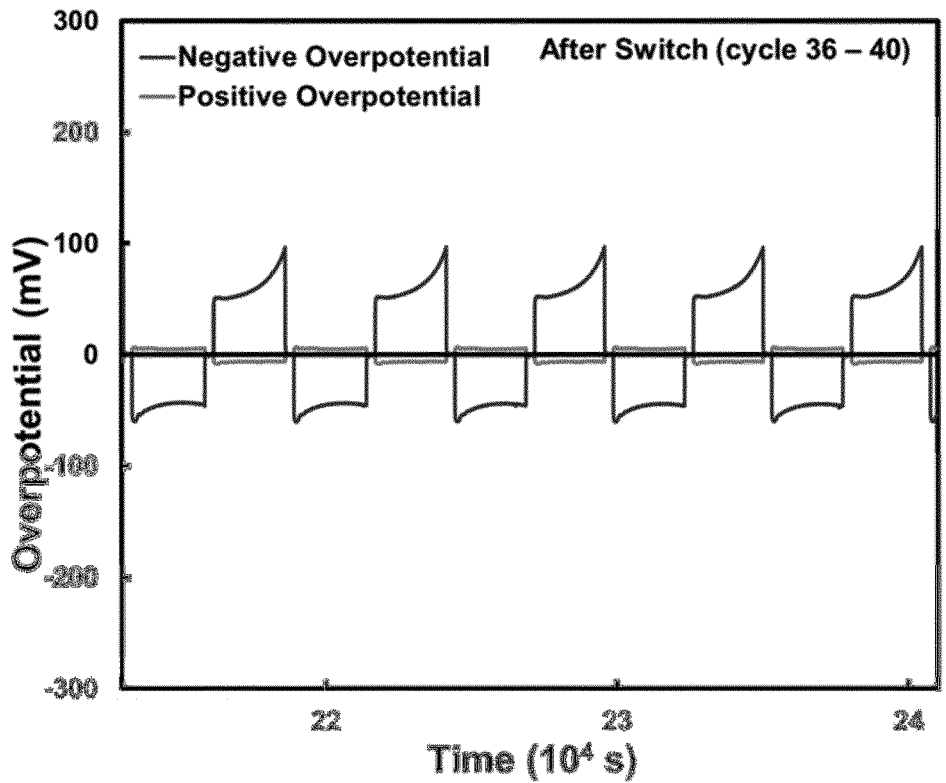

The results for the first 5 cycles after the switching of the positive and negative half cells in accordance with the first embodiment of the present invention are shown in FIG. 9(a). It is clear by comparing FIG. 3(a), which illustrates the first five cycles before the switch, with FIG. 9a that the negative overpotentials have decreased after switching. The results for cycles 36-40 after switching are shown in FIG. 9(b). If this figure is compared against FIG. 3(b), which illustrates the final five cycles before switching (namely cycles 43 to 47), it can be seen that although there has been some increase in the negative overpotential over the 40 cycles (~20 mV), the overpotential is still much less than that before switching. Thus, not only does switching appear to improve the performance of the negative half-cell initially, the improvement remains even at 40 cycles after switching. The positive and negative overpotentials during these cycles are summarised in FIG. 9c.

Figures 9C, 10A:
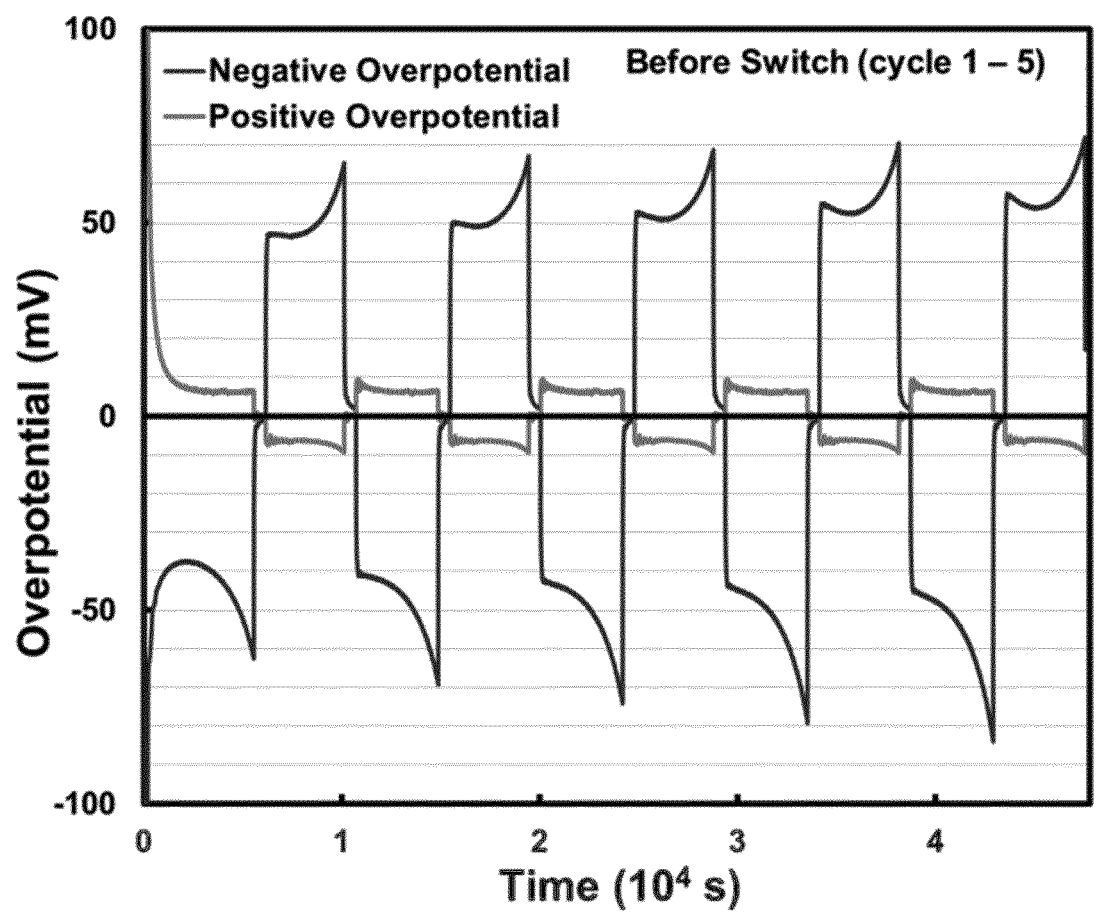
Figure 10B:
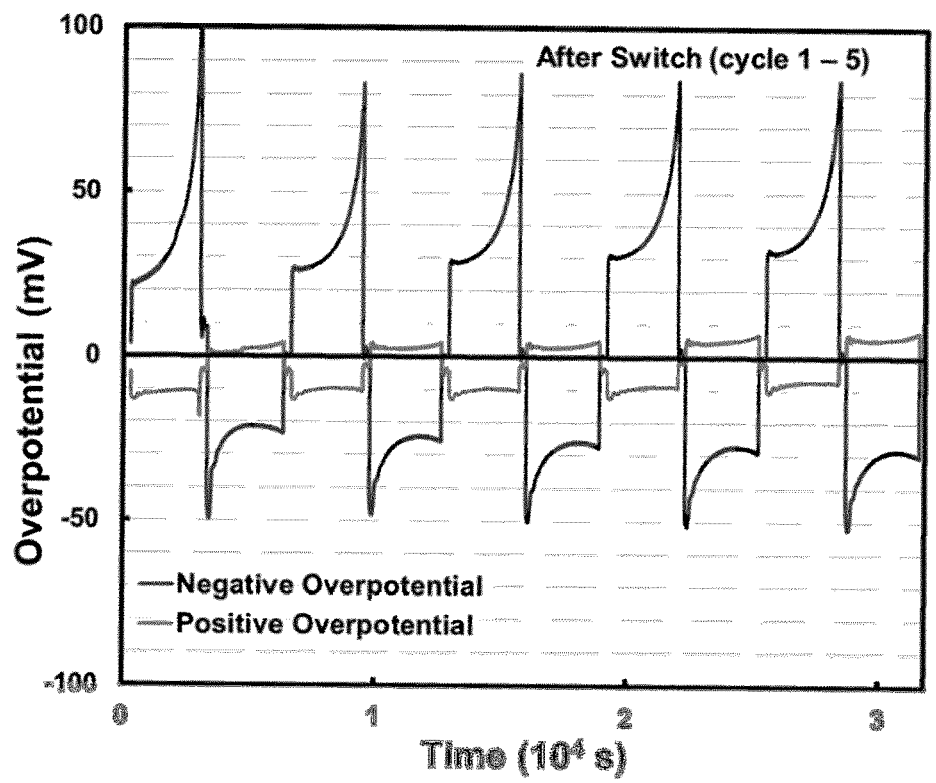
FIG. 10 shows a plot of the positive and the negative overpotentials during (a) the first 5 cycles of 47 cycles of the VFB of FIG. 1 before switching the electrodes and (b) the first 5 cycles of 40 cycles after switching the electrodes in accordance with the first embodiment of the method of the present invention.
Figure 11A:
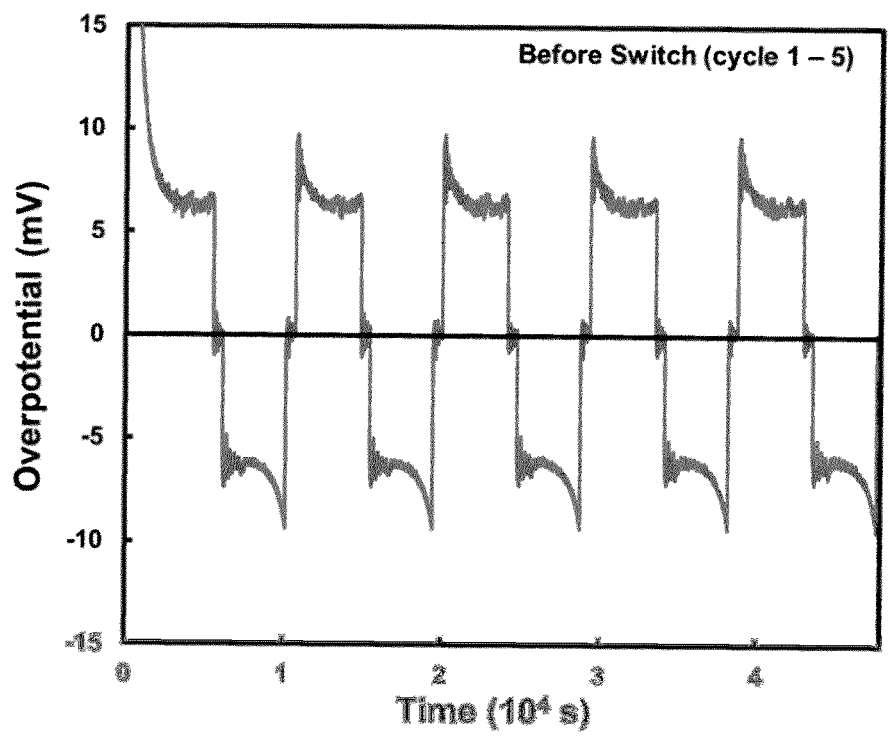
FIG. 11 shows a plot of the positive overpotentials during (a) the first 5 cycles and (b) the final 5 cycles of 47 cycles the VFB of FIG. 1 before switching the electrodes and (c) the first 5 cycles and (d) the final 5 cycles of 40 cycles after switching the electrodes in accordance with the first embodiment of the method of the present invention.
Figure 11B:
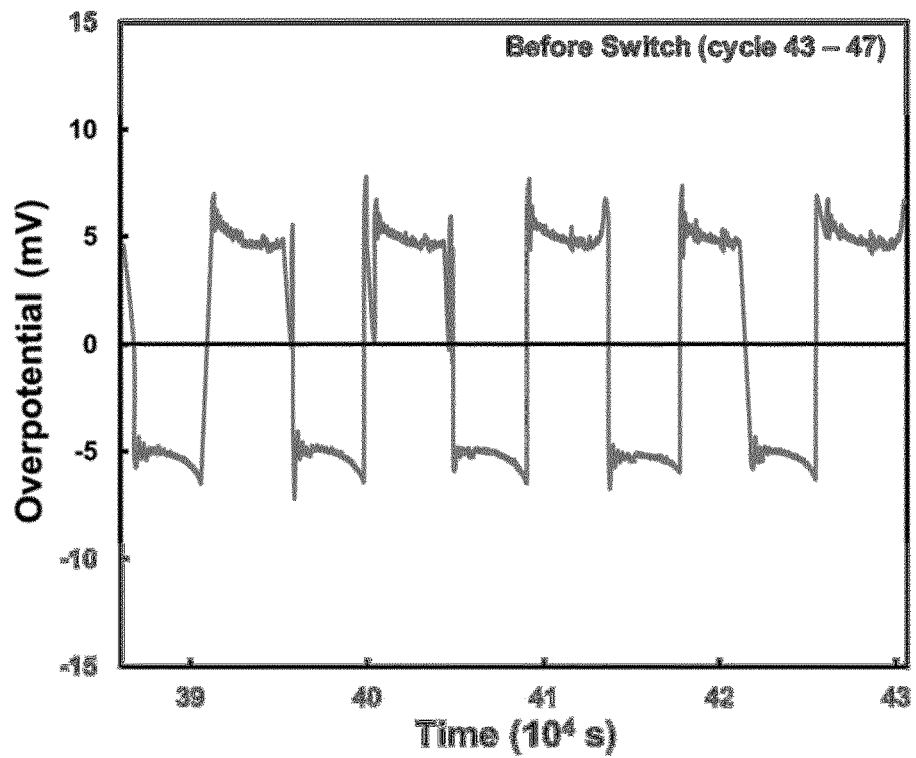
Figure 11C:
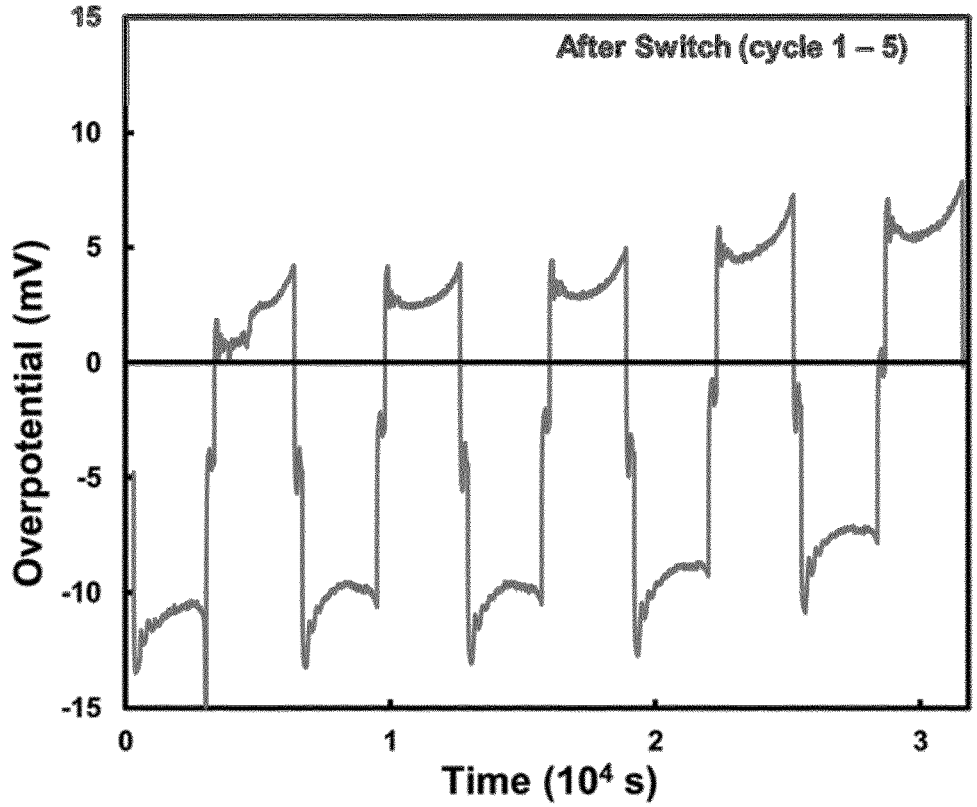
Figure 11D:
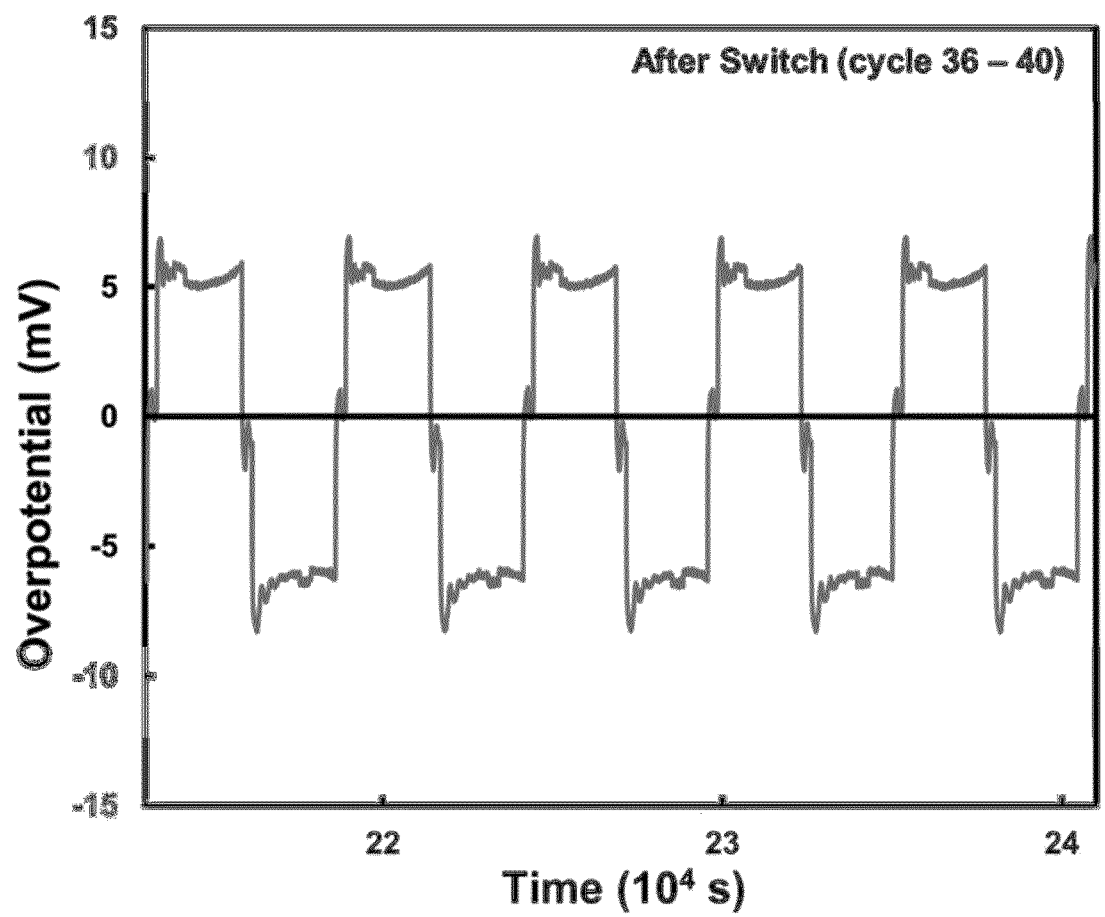

The overpotentials during (a) the first 5 (of 47 cycles) before switching the electrodes and (b) the first 5 cycles after switching the electrodes are compared more closely in FIG. 10 by plotting them on a more sensitive y-axis scale. It can be seen that the negative overpotentials after switching are in some cases significantly less than those with no treatment.

It should also be noted that although it can be seen that the switching of the electrodes significantly improves the performance of the negative half-cell, the overpotential of the negative half-cell is still significantly larger than that of the positive half-cell. This is in agreement with the results discussed in the background of the invention section, where it was noted that, in general, the kinetic rates of $V^{IV}/V^V$ are greater than those of $V^{II}/V^{III}$. The same result can be observed for all five carbon materials tested using both cyclic voltammetry and electrochemical impedance spectroscopy in a three-electrode cell apparatus.

FIG. 11 illustrates a comparison between the positive overpotentials during (a) the first 5 cycles and (b) the final 5 cycles (of 47 cycles) before switching with (c) the first 5 cycles and (d) the final 5 cycles (of 40 cycles) after switching. For all four plots, the positive overpotential remains low (<13 mV). Thus, it can be seen that switching does not cause significant changes to the positive overpotential.

Figure 12A:
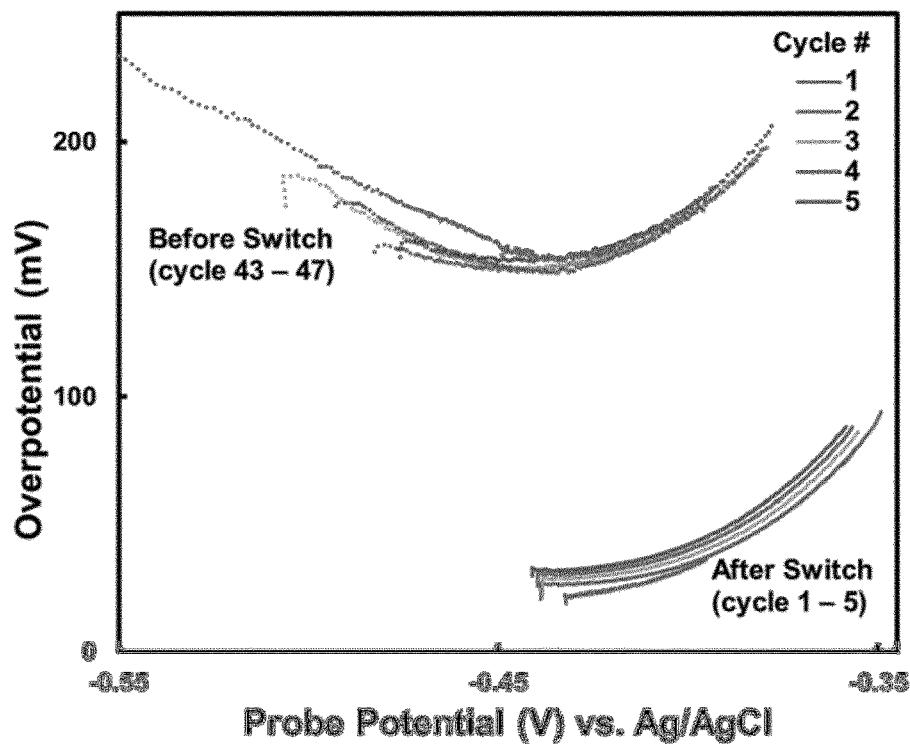
FIG. 12 shows a plot of the negative overpotentials versus probe potential during (a) discharging and (b) charging for the final 5 cycles of 47 cycles before switching the electrodes of the VFB of FIG. 1 and the first 5 cycles of 40 cycles after switching the electrodes in accordance with the first embodiment of the method of the present invention.
Figure 12B:
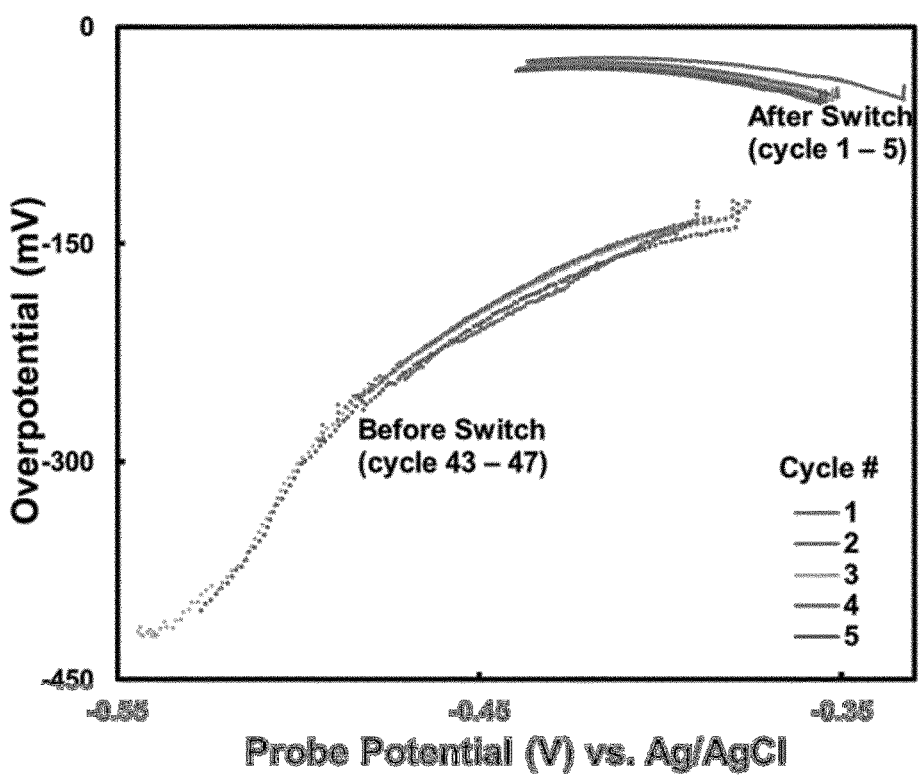

FIG. 12 illustrates the negative overpotentials versus negative probe potential (i.e. a function of the SoC) during (a) discharging and (b) charging for the final 5 cycles before switching the electrodes (dotted lines) and for the first 5 cycles after switching the electrodes (solid lines) are shown. It can be seen that although the operating SoC range of the system before and after switching are different, as seen by the change in operating probe potential range, there are regions of the two operating ranges that are common to both sets of curves. The overpotentials after switching are smaller than those before switching in these ranges: i.e. for the same SoC. This shows that the decrease in overpotential is indeed due to the treatment of the electrode. In fact, the treatment has resulted in the overpotential being divided by more than three; i.e. a reduction of the overpotential to less than that of fresh felt (as shown in FIG. 9c). The improvement is ascribed to the fact that the positive half-cell operating potential is positive enough to cause activation of the electrode for $V^{II}/V^{III}$.

The reduction in the overpotential of both electrodes which results from the implementation of the second embodiment of the invention (see FIG. 8) will now be described with the aid of further figures. As an example, the method of the second embodiment of the invention can be carried out directly after a cell has undergone 34 charge and discharge cycles. After overdischarging the electrolyte in each half-cell, the overdischarged electrolyte can be allowed to sit in its respective half-cell for 1 hour or more. A series of charging and discharging cycles can then be performed between the 'control' potentials previously mentioned and the overpotentials approximated as described for FIG. 2 after the positive and negative half-cell electrodes have been reactivated.

Figure 13:
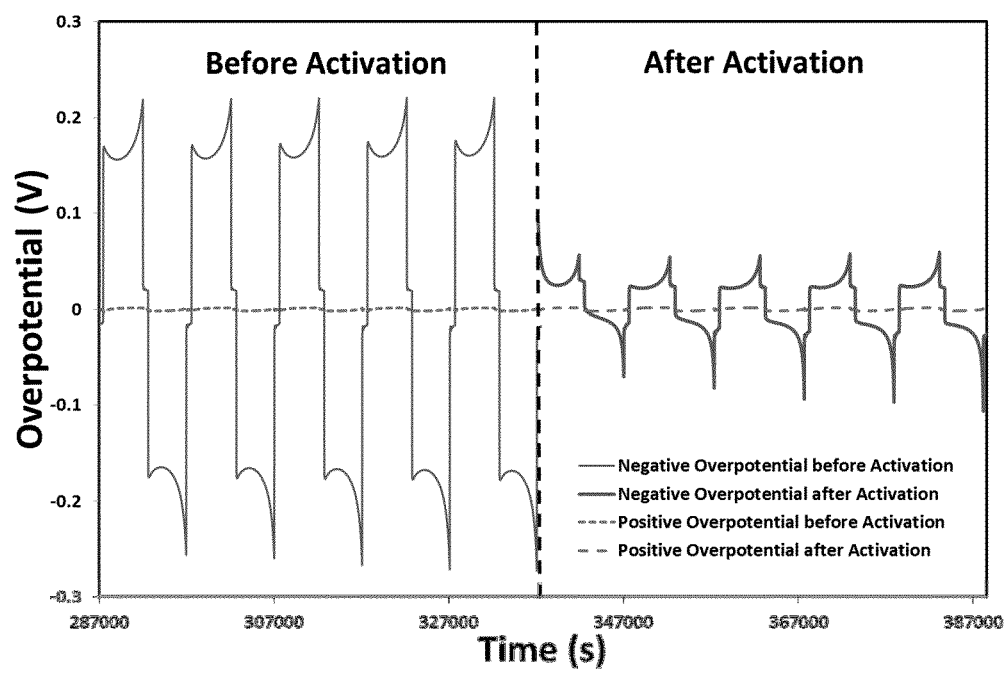
FIG. 13 shows a plot of both the positive and the negative overpotentials, both before (left hand side) and after (right hand side) the activation step. The last 5 cycles of 34 cycles before the activation step are shown on the left hand side and the first 5 cycles of 54 cycles after the activation step are shown on the right hand side. The activation step is in accordance with the second embodiment of the method of the present invention.
Figure 14:
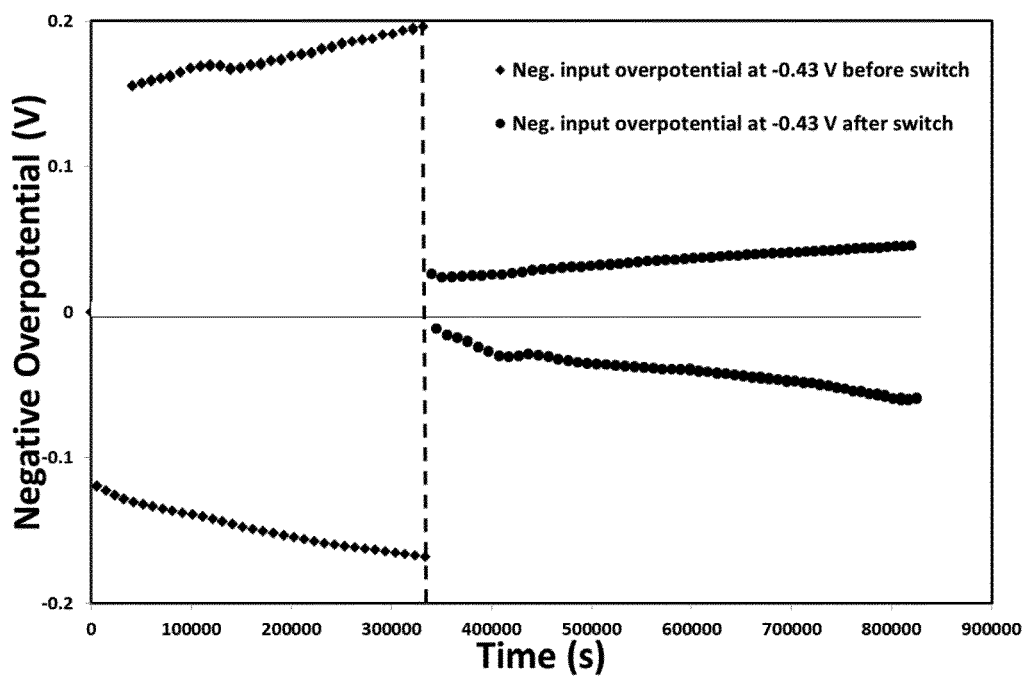
FIG. 14 shows a plot of the negative overpotential at a probe potential of −0.43 V (corresponding to a particular SoC) for both the 34 cycles before (left hand side) and the 54 cycles after (right hand side) the activation step in accordance with the second embodiment of the method of the present invention.

FIG. 13 compares the results for the first 5 cycles after the electrode activation with the last 5 cycles before electrode activation in accordance with the second embodiment of the present invention. It is clear by comparing the left hand side of FIG. 13, which illustrates the first five cycles before the switch, with the right hand side of FIG. 13 that the negative overpotentials have decreased significantly after activation. As before, the change in positive overpotential is almost insignificant, due to the fact that its magnitude is so small to begin with. To more clearly illustrate the changes in negative overpotential with time, the overpotential at a given SoC was recorded for each cycle, both before and after activation. The SoC was determined from the probe potential value, and so this amounted to recording the overpotential of the negative half-cell when the negative probe was at −0.43 V. FIG. 14 shows a plot of negative overpotential (for a probe potential of −0.43 V) vs. time for both the 34 cycles before and the 54 cycles after electrode activation. Both before and after activation, the negative overpotential increases slowly with time. However, even 54 cycles after activation, it is still much lower than the overpotential before activation. Thus, not only does activation appear to improve the performance of the negative half-cell initially, the improvement remains even at 54 cycles after activation.

The present invention provides numerous advantages. By minimising overpotentials at the carbon electrodes of flow batteries through reconditioning the battery by activating the electrodes, the efficiency of the battery is improved. The method can also be easily applied to large-scale or small scale VFBs, leading to significant improvements in energy efficiencies, and thus reduction in the operating costs of VFBs.

In addition, the decrease in overpotentials means that the potentials experienced by the electrodes will be less extreme. This results in a decrease in hydrogen and oxygen evolution, as well as other undesired side reactions. As a result, the colombic efficiency as well as the voltage efficiency is increased. Furthermore, less extreme potentials at the electrodes results in less degradation of the electrodes, thereby increasing battery life.

The method of the present invention also has the advantage that it can be applied in-situ, and in most embodiments can be applied without the need for disassembly of the system.

The embodiments in the invention described with reference to the drawings may comprise a computer apparatus and/or processes performed in a computer apparatus. The invention may comprise computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk.

The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention claimed is:

1. A method for improving the energy efficiency of a vanadium flow battery, VFB, comprising a cell comprising a negative half-cell and a positive half-cell, the negative half-cell comprising a negative electrode and a negative electrolyte, and the positive half-cell comprising a positive electrode and a positive electrolyte, the method comprising:
reconditioning the negative electrode and/or the positive electrode of the VFB by applying an activation potential to the negative electrode resulting in the over discharge of the negative electrolyte from $V^{II}/V^{III}$ to at least $V^{IV}$ and/or applying an activation potential to the positive electrode resulting in the over discharge of the positive electrolyte from $V^{IV}/V^{V}$ to at least $V^{III}$ while controlling the current through the cell or the potential at the negative or the positive electrode.

2. The method of claim 1, wherein the step of applying a potential resulting in the overdischarge of the negative electrolytes and/or the positive electrolyte comprises preventing pumping of the positive electrolyte through the positive half-cell to/from a positive reservoir and/or preventing pumping of the negative electrolyte through the negative half-cell to/from a negative reservoir of the VFB during a discharge cycle.

3. The method of claim 1, further comprising the step of re-establishing the state of charge, SoC, of the positive electrolyte in the positive half-cell and/or the negative electrolyte in the negative half-cell to the operating SoCs prior to restarting the operation of the VFB.

4. The method of claim 1, wherein the step of re-establishing the state of charge, SoC, of the positive electrolyte in the positive half-cell and/or the negative electrolyte in the negative half-cell to the operating SoCs comprises the step of pumping the positive electrolyte through the positive half-cell to/from the positive reservoir and/or pumping the negative electrolyte through the negative half-cell to/from the negative reservoir of the VFB prior to commencing a charging cycle of the VFB.

5. The method of claim 1 further comprising applying the potential to the positive electrode and/or applying the potential to the negative electrode for a number of charge and discharge cycles corresponding to an initial controlled charging cycle.

6. The method of claim 1, wherein the step of reconditioning the negative electrode and/or the positive electrode of the VFB is performed prior to a first charge/discharge cycle of the battery.

7. The method of claim 1, wherein the step of reconditioning the negative electrode and/or the positive electrode of the VFB is performed after a number of cycles.

8. The method of claim 1, wherein the step of reconditioning the negative electrode and/or the positive electrode of the VFB is performed a number of cycles after a previous reconditioning.

9. The method of claim 1, wherein the step of applying the activation potential to the negative electrode comprises applying a potential more positive than −0.8V (vs $Hg/Hg_2SO_4$) to the negative electrode and the step of applying the activation potential to the positive electrode comprises applying a potential more negative than +0.4V (vs $Hg/Hg_2SO_4$) to the positive electrode.

* * * * *